United States Patent
Rosenkilde et al.

(10) Patent No.: US 12,277,408 B2
(45) Date of Patent: Apr. 15, 2025

(54) USING INDENTATION TO TRIM OUTPUT OF A LANGUAGE SYNTHESIS MODEL

(71) Applicant: Microsoft Technology Licensing, LLC, Redmond, WA (US)

(72) Inventors: Johan Sebastian Heesemann Rosenkilde, Birkerød (DK); Albert Ziegler, Uppsala (SE); Oegerikus De Moor, Tas-Sliema (MT); Maksym Taran, Scottsdale, AZ (US); Edward Emil Aftandilian, Sunnyvale, CA (US); Arjuna Ganesh Sittampalam, St Neots (GB); Krzysztof Stanisław Cieślak, Łódź (PL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/853,105

(22) Filed: Jun. 29, 2022

(65) Prior Publication Data
US 2024/0004619 A1    Jan. 4, 2024

(51) Int. Cl.
G06F 9/44      (2018.01)
G06F 8/33      (2018.01)
G06F 8/35      (2018.01)

(52) U.S. Cl.
CPC . G06F 8/35 (2013.01); G06F 8/33 (2013.01)

(58) Field of Classification Search
CPC ..................................... G06F 8/35; G06F 8/33
See application file for complete search history.

(56) References Cited

U.S. PATENT DOCUMENTS

| 5,754,859 A * | 5/1998 | Long .................. G06F 8/33 |
| | | 345/418 |
| 2003/0177136 A1 | 9/2003 | Alpert |
| 2007/0226708 A1 | 9/2007 | Varma et al. |
| 2007/0256062 A1 | 11/2007 | Madden |

(Continued)

FOREIGN PATENT DOCUMENTS

CN    113378544 A    9/2021

OTHER PUBLICATIONS

"Notice of Allowance Issued in U.S. Appl. No. 17/845,739", Mailed Date: Aug. 18, 2023, 8 Pages.

(Continued)

*Primary Examiner* — Hang Pan
(74) *Attorney, Agent, or Firm* — Workman Nydegger

(57) ABSTRACT

Using indentation to trim output of a language synthesis model. A computer system determines a first indentation level associated with a cursor within an editor buffer. The computer system identifies a block of line(s) from an output from a language synthesis model. Each line in the block meets at least one criterion from a set of criteria, including a first criterion that the line is an initial line in the output from the language synthesis model, a second criterion that the line has a second indentation level that is greater than the first indentation level, and a third criterion that the line contains a continuation token. The computer system identifies a particular line, immediately following the block, that does not meet any criterion from the set of criteria. The computer system trims the output from the language synthesis model from the particular line onward.

18 Claims, 6 Drawing Sheets

(56) References Cited

U.S. PATENT DOCUMENTS

| | | | |
|---|---|---|---|
| 2008/0059506 A1 | 3/2008 | Kalia et al. | |
| 2016/0026439 A1* | 1/2016 | Zaydman | G06F 8/33 717/113 |
| 2018/0364992 A1 | 12/2018 | Yamamoto | |
| 2023/0113578 A1* | 4/2023 | Kumar | G06F 16/93 705/30 |
| 2023/0409300 A1 | 12/2023 | Rosenkilde | |

OTHER PUBLICATIONS

Jonge, et al., "Natural and Flexible Error Recovery for Generated Parsers", In Proceedings of the Software Language Engineering: Second International Conference, Oct. 5, 2009, pp. 204-223.

"International Search Report and Written Opinion Issued in PCT Application No. PCT/US23/022531", Mailed Date: Aug. 14, 2023, 11 Pages.

U.S. Appl. No. 17/845,739, filed Jun. 21, 2022.

* cited by examiner

300

```
1: def myfun():                    301
2: ⊢→if ▮
        ╲ 302
```

```
1: def myfun():                    401
2: ⊢→
3: ⊢→▮
```

```
1: def myfun():                    501
2: ⊢→
3: ⊢→▮
4: ⊢→
5: ⊢→print("Hello")
```

```
1: void hello()                601
2: ▮
```

```
      ⎧ 1: {                              602
      ⎪ 2: ↦print("Hello, World!");
603 ⎨ 3: }
      ⎪ 4:
      ⎩ 5: int function2()
        6: {
        ...
```

```
1: def myfun():                701
2: ↦if (condition):
3: ▮
```

```
      ⎧ 1: ↦↦statement 1           702
      ⎪ 2: ↦↦statement 2
703 ⎨ 3: ↦else:
      ⎪ 4: ↦↦statement 1
      ⎩ 5: ↦↦statement 2
        6:
        7: x = 23
        ...
```

```
1: def hellofun():                801
2: ↦▮
3: ↦print("Hello")
```

```
      ⎧ 1: ↦if (false):              802
      ⎪ 2: ↦↦print("false")
803 ⎨ 3: ↦else:
      ⎪ 4: ↦↦print("true")
      ⎩ 5: ↦print("Hello")
        6:
        7: ↦ x = 23
        ...
```

```
1: def hello():                   901
2: ↦print(▮
```

```
      ⎧ 1: "Hello, World!")          902
903 ⎨ 2: ↦// And a second time
      ⎩ 3: ↦print("Hello again!")
        ...
```

*FIG. 9*

USING INDENTATION TO TRIM OUTPUT OF A LANGUAGE SYNTHESIS MODEL

BACKGROUND

In computing, parsing, syntax analysis, or syntactic analysis refers to a formal analysis by a computer of an input string, resulting in identification of constituent parts of the input string, and in identification of syntactic relationships between those constituent parts. When applied to the analysis of computer languages, parsing refers to the syntactic analysis of input code into its component parts, which facilitates compilation, interpretation, etc. A source code parser is a software component that parses computer source code. Source code parsers are written to target a specific source code language (or languages), based on detailed knowledge of the grammar rules of the target source code language(s). Source code parsers take input source code and build a data structure, such as an abstract syntax tree, that captures the exact structure of the source code, according to the grammar rules of a language in which the source code was written.

Additionally, in computing, artificial intelligence (AI) refers to the capability of a computer system to mimic human cognitive functions such as learning and problem-solving. One application of AI is machine learning (ML), which creates and uses mathematical models of data. ML algorithms build a model based on sample data, known as training data, in order to make predictions or decisions without being explicitly programmed to do so. One application of AI and ML is the creation of language synthesis (or generation) models. Once trained, language synthesis models consume an input prompt comprising a portion of text along with a requested prediction length, and synthesize a prediction of the requested length for how to continue that text. When trained using computer languages, language synthesis models (e.g., code synthesis models) can be used to synthesize code based on an input prompt. In one application, such language synthesis models are integrated into a source code editor, such as within an integrated development environment (IDE), to provide AI/ML-based code completion suggestions that can, for example, provide suggestions for how to complete entire functions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processor, for using indentation to trim output of a language synthesis model, the method including: determining a first indentation level associated with a cursor within an editor buffer; identifying a block of one or more lines from an output from a language synthesis model, each line in the block of one or more lines meeting at least one criterion from a set of criteria, the set of criteria including: a first criterion that the line is an initial line in the output from the language synthesis model, a second criterion that the line has a second indentation level that is greater than the first indentation level, and a third criterion that the line contains a continuation token; identifying a particular line, immediately following the block of one or more lines, that does not meet any criterion from the set of criteria; and trimming the output from the language synthesis model from the particular line onward.

In some aspects, the techniques described herein relate to a computer system for using indentation to trim output of a language synthesis model, including: a processor; and a computer storage media that stores computer-executable instructions that are executable by the processor to cause the computer system to at least: determine a first indentation level associated with a cursor within an editor buffer; identify a block of one or more lines from an output from a language synthesis model, each line in the block of one or more lines meeting at least one criterion from a set of criteria, the set of criteria including: a first criterion that the line is an initial line in the output from the language synthesis model, a second criterion that the line has a second indentation level that is greater than the first indentation level, and a third criterion that the line contains a continuation token; identify a particular line, immediately following the block of one or more lines, that does not meet any criterion from the set of criteria; and trim the output from the language synthesis model from the particular line onward.

In some aspects, the techniques described herein relate to a computer program product including a computer storage media that stores computer-executable instructions that are executable by a processor to cause a computer system to use indentation to trim output of a language synthesis model, the computer-executable instructions including instructions that are executable by the processor to cause the computer system to at least: determine a first indentation level associated with a cursor within an editor buffer; identify a block of one or more lines from an output from a language synthesis model, each line in the block of one or more lines meeting at least one criterion from a set of criteria, the set of criteria including: a first criterion that the line is an initial line in the output from the language synthesis model, a second criterion that the line has a second indentation level that is greater than the first indentation level, and a third criterion that the line contains a continuation token; identify a particular line, immediately following the block of one or more lines, that does not meet any criterion from the set of criteria; and trim the output from the language synthesis model from the particular line onward.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 3 illustrates an example of identifying an indentation level of a cursor within a non-blank line;

FIGS. 4 and 5 illustrate examples of identifying an indentation level of a cursor within a blank line;

FIGS. 6-9 illustrate examples of operation of the language synthesis output trimming component.

DETAILED DESCRIPTION

Figure 1:
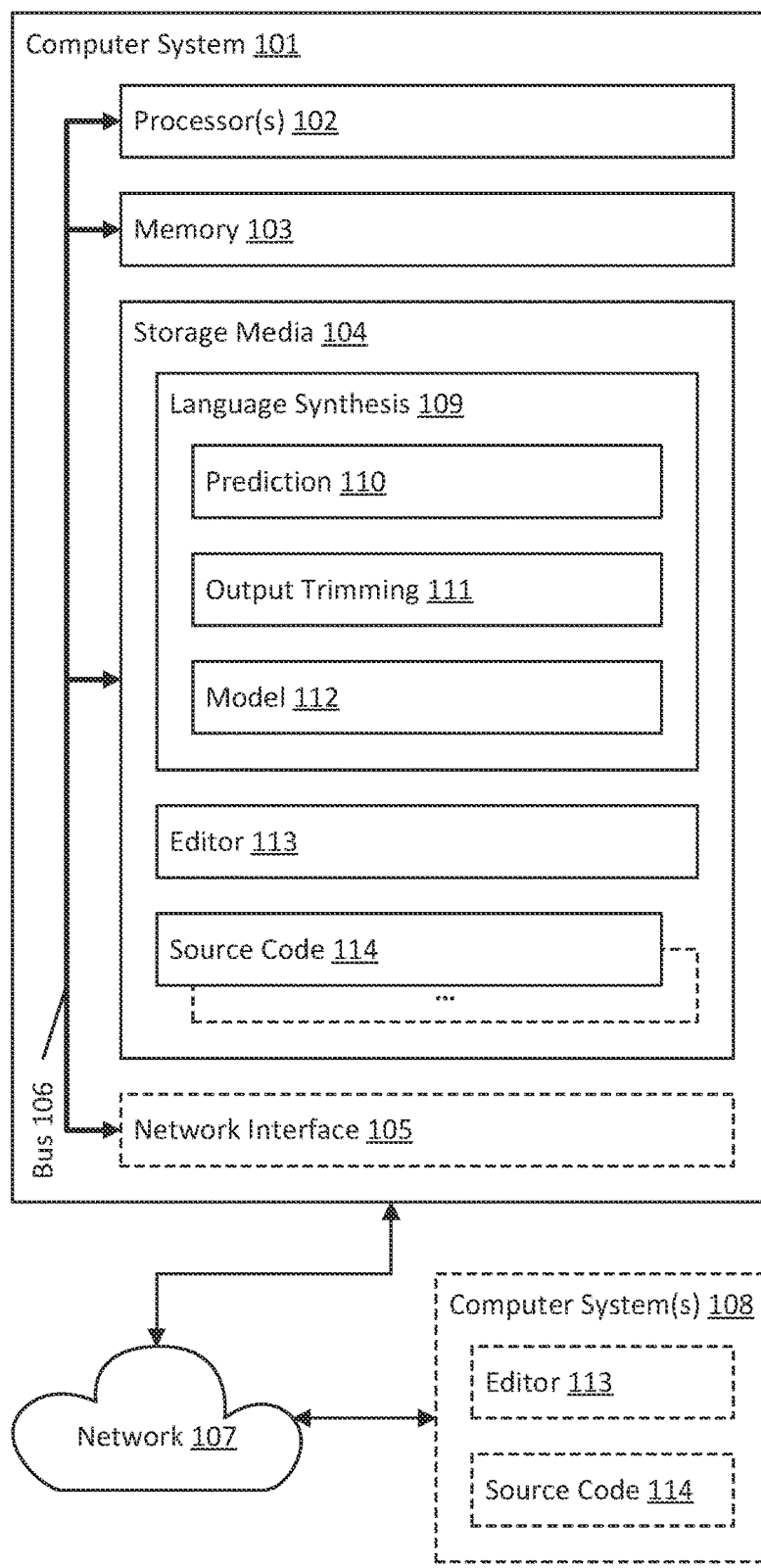
FIG. 1 illustrates an example computer architecture that facilitates using indentation to trim output of a language synthesis model.

There are challenges in determining how much of the prediction generated by a language synthesis model is actually relevant to an input prompt. For example, when providing a language synthesis model that has been trained with natural language with a prompt comprising the start of a sentence, the model may generate a prediction that includes many sentences or even many paragraphs. Similarly, when providing a language synthesis model that has been trained with computer languages with a prompt comprising the start of a context (e.g., class, function, conditional statement, loop), the model may generate a prediction that completes that context, and then continues on to one or more additional contexts. Thus, while the beginning of a language synthesis model's prediction is often relevant to the prompt, the prediction often becomes less relevant the longer it goes on. As a result, it is often useful to determine a point after which a model's prediction should be trimmed as no longer relevant to the prompt for which it was generated.

When using a language synthesis model within the context of computer languages, it may be possible to input the language synthesis model's prediction to a source code parser, in order to capture the exact structure of the source code generated as part of the prediction, and to therefore determine which portion of the prediction is relevant to a prompt. However, there are several challenges with using conventional source code parsers to understand language synthesis model predictions. For example, source code parsing is computationally expensive, and thus conventional source code parsers are not suitable for situations in which responsiveness is a priority—such as when parsing is integral to a human-interactive experience. For example, some source code editors provide intelligent interactive suggestions using language synthesis models, and using a conventional source code parser on the model's output could introduce unacceptable lag in the editor's suggestions. Additionally, the code generated by a language synthesis model may be in a partially completed state, may have syntax errors, and/or may be authored in an unknown programming language (or even a mix of programming languages). Thus, conventional source code parsers may fail to parse a model's prediction due to incomplete grammar, due to grammatical errors, and/or due to a lack of understanding of the grammar(s) of the code generated.

The embodiments described herein are directed to using indentation-based partial parsing to trim output of a language synthesis model. Unlike conventional parsing, which captures the exact structure of source code using grammatical rules, the embodiments described herein parse a language synthesis model's prediction "partially" based on indentation, in order to determine where to trim the output of the model's prediction (and, in turn, to determine which portion of the model's prediction is contextually-relevant to a prompt). These embodiments operate on the basis that humans, and many source code editors, generally adhere to strong conventions around the use of indentation when authoring source code—even though, in most source code languages, indentation is completely optional. Thus, unlike conventional code parsing that relies on strict language-specific grammatical rules, the embodiments herein determine which portion of a language synthesis model's prediction is relevant based primarily on indentation within that prediction.

Notably, parsing a language synthesis model's prediction partially based on indentation overcomes each of the foregoing deficiencies of conventional parsers. For example, because the indentation-based partial parsing techniques described herein avoid performing a full grammatical analysis, they are less computationally-intensive than conventional parsing techniques, and are therefore suitable for situations in which responsiveness is a priority (e.g., human-interactive code editor experiences). This also means that indentation-based partial parsing techniques conserve power and computing resources, as compared to conventional parsing techniques. Additionally, by avoiding performing a full grammatical analysis, the indentation-based partial parsing techniques described herein are resilient to code that is in a partially completed state, that has syntax errors, and/or that is authored in an unknown language.

FIG. 1 illustrates an example computer architecture 100 that facilitates using indentation to trim output of a language synthesis model. As shown, computer architecture 100 includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), all interconnected by a bus 106. As shown, computer system 101 may also include a network interface 105 (e.g., one or more network interface cards) for interconnecting (via a network 107) to computer system(s) 108 (e.g., a single computer system, or a plurality of computer systems).

The storage media 104 is illustrated as storing computer-executable instructions implementing at least a language synthesis component 109 and an editor 113. In embodiments, the editor 113 provides an environment (e.g., an integrated development environment) for authoring source code 114, while the language synthesis component 109 uses a prediction component 110, together with a model 112, to generate AI/ML-based code suggestions to the editor 113. In embodiments, the model 112 is a language synthesis model that has been trained using one or more computer languages. Examples of computer languages on which the model 112 may be trained include source code languages such as C, C++, C #, Java, Python, etc.; markup and data formatting languages such as HyperText Markup Language (HTML), Cascading Style Sheets (CSS), Extensible Markup Language (XML), JavaScript Object Notation (JSON), etc.; query languages such as Structured Query Language (SQL), Language Integrated Query (LINQ), etc.; and the like. In embodiments, the prediction component 110 uses one or more portions of source code 114 that is being edited within the editor 113 as a prompt for the model 112, in order to generate a code completion suggestion (e.g., for insertion at a cursor within a buffer of the editor 113).

While, as shown, the editor 113 and/or the source code 114 may reside at computer system 101, in embodiments, the editor 113 and/or the source code 114 may reside at one or more computer system(s) 108. In various embodiments, the computer system 101 provides local language synthesis services to an editor executing at the computer system 101, the computer system 101 provides remote language synthesis services to editor(s) running at the computer system(s) 108, and/or the computer system 101 provides remote language synthesis services and editor services to computer system(s) 108.

Additionally, while the language synthesis component 109 is illustrated in FIG. 1 as being separate from the editor 113, in some embodiments the language synthesis component 109 is part of the editor 113. Additionally, or alternatively, while the output trimming component 111 is illustrated in FIG. 1 as being part of the language synthesis component 109, in some embodiments the output trimming component 111 is part of the editor 113, or is part of a middle-layer between the language synthesis component 109 and the editor 113.

As mentioned, the embodiments described herein are directed to using indentation-based partial parsing, in order to trim output of a language synthesis model. Thus, the language synthesis component 109 is illustrated as including an output trimming component 111, which uses indentation associated with a cursor in the editor 113, together with line indentations within a prediction output by the model 112, to trim that prediction so that it is contextually relevant to a location of the cursor. In embodiments, the output trimming component 111 identifies a block (i.e., a single line, or a contiguous block of a plurality of lines) of the model 112's prediction that is relevant to the cursor, and then trims anything that follows that block from the prediction. In embodiments, a block includes an initial line in the prediction (e.g., for insertion at the position of the cursor), plus all lines with higher indentation than the cursor, until indentation returns to the indentation level of the cursor—with some exceptions (as described herein).

In embodiments, the output trimming component 111 operates in parallel with the prediction component 110 (e.g., a "streaming mode"), such that when the output trimming component 111 has identified the end of a block, the output trimming component 111 ceases further prediction by the prediction component 110/model 112.

In the examples herein, including in the drawings, each level of indentation is visually indicated with an arrow (i.e., ↦ ). In various embodiments, each level of indentation is defined using one or more tab characters, using one or more space characters, or using combinations of tab and space characters. In embodiments, a blank line (e.g., a line containing no characters at all, or a line containing only whitespace characters such as spaces or tabs) is defined as having the same indentation level as a most recent non-blank line (e.g., a line containing at least one non-whitespace character).

Figure 2:
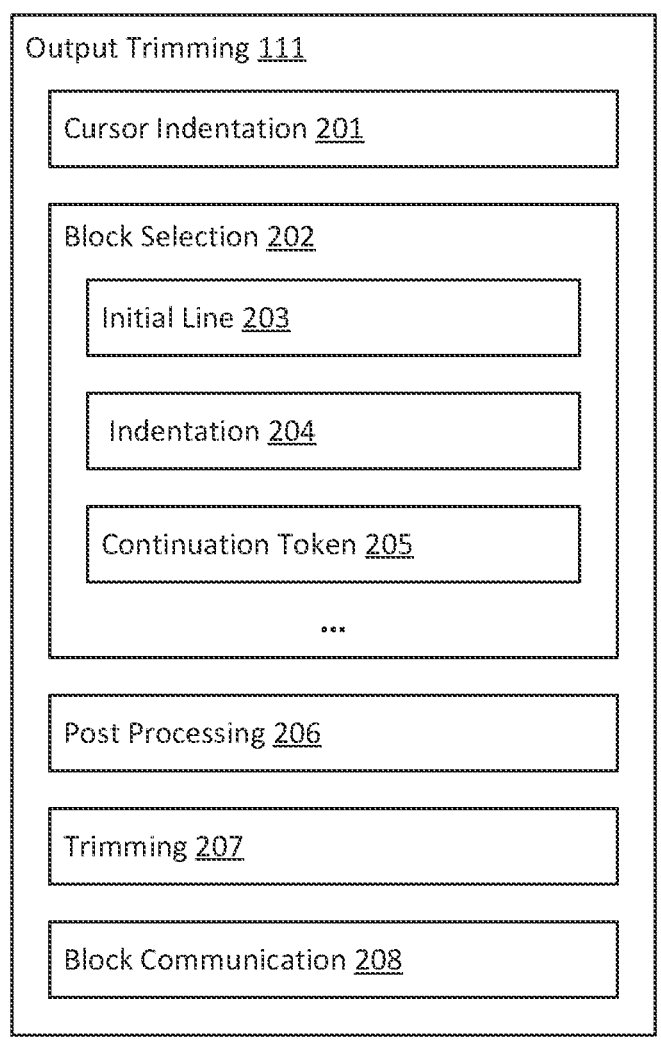
FIG. 2 illustrates an example of internal components of a language synthesis output trimming component.

FIG. 2 illustrates an example 200 of internal components of the output trimming component 111 of FIG. 1. Each internal component of the output trimming component 111 depicted in FIG. 2 represents various functionalities that the output trimming component 111 might implement in accordance with various embodiments described herein. It will be appreciated, however, that the depicted components—including their identity and arrangement—are presented merely as an aid in describing example embodiments of the output trimming component 111.

In embodiments, the output trimming component 111 includes a cursor indentation component 201, which determines an indentation level associated with a cursor within a buffer of the editor 113 (e.g., a buffer corresponding to source code 114).

When a cursor is located within a non-blank line, in embodiments the cursor indentation component 201 determines the indentation level of the cursor to be equal to an indentation level of that non-blank line. For example, FIG. 3 illustrates an example 300 comprising source code 301, in which a cursor 302 (illustrated as a black block) is located at the end of an "if" statement on line 2. Here, the cursor indentation component 201 identifies an indentation level of the cursor to be one, which (as indicated by a single arrow) is the indentation level of line 2 of the source code 301.

When a cursor is located within a non-blank line, in some embodiments the cursor indentation component 201 determines the indentation level of the cursor to be equal to an indentation level of the most recent non-blank line before the cursor. For example, FIG. 4 illustrates an example 400 comprising source code 401, in which a cursor is located on a blank line (line 3). Here, the cursor indentation component 201 identifies an indentation level of the cursor to be zero, which is the indentation level of the most recent non-blank line before the cursor (i.e., line 1 of the source code 401). Notably, in embodiments, if a file/buffer has only blank lines, the cursor indentation component 201 defines the indentation level of the cursor to be zero.

In other embodiments, when the cursor is located within a non-blank line, the cursor indentation component 201 determines the indentation level of the cursor to be equal to a maximum of an indentation level of the most recent non-blank line before the cursor, and an indentation level of the next non-blank line after the cursor. For example, FIG. 5 illustrates an example 500 comprising source code 501, in which a cursor is located on a blank line (line 3). Here, the cursor indentation component 201 identifies an indentation level of the cursor to be one, which is the maximum of the indentation level of the most recent non-blank line before the cursor (i.e., line 1 of the source code 501, whose indentation level is zero) and the indentation level of the next non-blank line after the cursor (i.e., line 5 of the source code 501, whose indentation level is one).

In embodiments, the output trimming component 111 also includes a block selection component 202, a post-processing component 206, a trimming component 207, and a block communication component 208. In embodiments, the block selection component 202 analyzes a sequence of lines from a prediction from the model 112. In some embodiments, the block selection component 202 analyzes these lines sequentially, such as in an iterative manner. For each line, the block selection component 202 uses one or more criteria to determine if the line should be included in a selected block of lines. Once the block selection component 202 reaches a line that does not meet these criteria, the trimming component 207 trims the prediction from that line onward (i.e., any portion of the prediction that comes after the selected block). In embodiments, the post-processing component 206 may also modify the selected block of lines to remove any trailing blank lines from the selection. In some embodiments, such as when operating in a "streaming mode," the trimming component 207 also ceases output generation by the prediction component 110/model 112 (e.g., because no further prediction is needed). This conserves power and computing resources, by stopping model generation prior to the model 112 having completed a requested prediction length. The block communication component 208 communicates the selected block to the editor 113 for insertion at the cursor, for using as suggested insertion, or the like.

In FIG. 1, the block selection component 202 includes an initial line component 203, an indentation component 204, and a continuation token component 205, which each represent examples of criterion that the block selection component 202 can apply to each line. Ellipses within the block selection component 202 indicate that some embodiments may use additional (or even alternate) criteria.

The initial line component 203 indicates that, in embodiments, the block selection component 202 selects an initial line in a model 112's prediction for inclusion in the selected block. This is because the initial line of the model 112's prediction is the model 112's continuation of the line containing the cursor (i.e., that line should be appended at the cursor's location), and thus this initial line should be included in the block.

The indentation component 204 indicates that, in embodiments, the block selection component 202 selects a line from model 112's prediction for inclusion in the selected block so long as that line has a greater indentation level than the indentation level associated with the cursor (e.g., as determined by the cursor indentation component 201). Thus, using the indentation component 204, the output trimming component 111 applies a partial parsing to the model 112's prediction that is based on selecting lines that are more deeply indented than an indentation level associated with the cursor. In embodiments, if the model 112's prediction has blank line(s) following any non-blank line, the indentation component 204 considers these blank line(s) to have indentation strictly greater than the cursor's indentation (i.e., the indentation component 204 includes those line(s) in the block).

In embodiments, there are situations where the block selection component 202 selects a line for inclusion in the selected block even if that line is not the initial line in the model 112's prediction (initial line component 203), and even if that line does not have an indentation level that exceeds that of the cursor (indentation component 203 204). In particular, the continuation token component 205 indicates that, in embodiments, the block selection component 202 selects a line for inclusion in the selected block if it contains a "continuation token". In embodiments, a continuation token is a continuation keyword or continuation symbol that indicates that a line is contextually joined with its preceding line, even though that line may have the same, or even a lower, indentation level as the preceding line. As examples, continuation keywords may define same-level control flow (e.g., 'then', 'else', 'elseif', 'catch', 'except', 'finally', 'ensure'), may define end keywords (e.g., 'fi', 'esac', 'done', 'end', 'endif', 'loop', 'until', 'where', 'when'), and the like. As examples, continuation symbols may include brace control symbols (e.g., '{', '}', '[', ']', '(, ')'), multi-line string endings (e.g., '"""', '"""'), multi-line comment endings (e.g., '*/', '"'), and the like. In some embodiments, continuation tokens are defined using regular expressions, or some other pattern-matching language. In some embodiments, a continuation token may only be recognized if they appear at the beginning of the line (ignoring prefixed whitespace), though this behavior could vary by token.

In embodiments, some continuation tokens only continue blocks where indentation equals the cursor's indentation level, while other continuation tokens may continue blocks at lower indentation levels as well. In some embodiments, the behavior of a continuation token may be language specific; for example, when the language is C, the '#' symbol may only be a continuation token if it appears at equal indentation to the cursor (e.g., a non-zero value), or at an indentation level of zero, but nothing in between. This, for example, can be used to select lines defining macro guards surrounding code snippets, which may be indented at level zero. For example:

```
#ifdef PLATFORM_XBOX
↪graphics_quality ("highest")
#endif
```

In embodiments, a common feature of continuation tokens is that they generally appear at the same indentation level as a preceding line, even though they are syntactically subordinate to that line. In one example, an if . . . else block is commonly written in the form of:

```
if (condition)
↪action
else
↪action
```

Here, the 'else' keyword is at the same indentation level as the 'if' keyword, even though it is syntactically subordinate to the 'if' keyword. In another example, a multi-line comment may be written in the form of:

```
// comment line 1
// comment line 2
```

Here, the '//' symbol of second line has the same indentation level as the '//' symbol of the first line, even though the two lines operate together as a single multi-line comment.

In some embodiments, the continuation token component 205 only selects a line for inclusion in the selected block if the cursor is in a context applicable to a given continuation token. For example, the continuation token component 205 may only recognize a multi-line comment ending as a valid continuation token for a predicted line if the cursor is in a line that is within the context of a multi-line comment.

As will be appreciated, at times the criteria described above may result in a selected block of lines that ends with trailing blank lines. In some embodiments, the post-processing component 206 modifies the selected block of lines to remove any trailing blank lines from the selection. This ensures that the selected block (which, for example, is used for a code completion suggestion) ends with a non-blank line.

FIGS. 6-9 Illustrate examples 600-900 of operation of the output trimming component 111 on predictions by the model 112. In FIG. 6, example 600 shows a buffer 601 (e.g., a buffer that is open in the editor 113), and a prediction 602 generated by the model 112 for that buffer 601. In example 600, a cursor is located at line 2 of the buffer 601. Since line 2 is a blank line, the cursor indentation component 201 identifies an indentation level of zero for the cursor, which is the indentation level of line 1 (i.e., the most recent non-blank line preceding the cursor). Prediction 602 includes lines 1 to 6, though the ellipses indicate that it could continue. A brace 603 indicates a block of lines that are selected by the block selection component 202. Here, line 1 is included in the block, because it is the first line in the prediction and thus the line is included by the initial line component 203. Line 2 is also included in the block, because line 2 has a greater indentation level than the cursor and thus the line is included by the indentation component 204. Line 3 is also included in the block, even though the line has the same indentation level as the cursor, because it contains a '1' symbol, which is a continuation token and thus the line is included by the continuation token component 205. Line 4 is initially included in the block, because it is blank. Line 5 is not included in the block, because it has the same indentation level as the cursor, and because it is not the first line in the prediction and contains no continuation token; thus, line 5, and any lines following it, are trimmed by the trimming component 207. While line 4 was initially included in the block, in embodiments it is later removed from the block by the post-processing component 206, as being a trailing blank line. The prediction component 110 has therefore selected an appropriate block of lines (i.e., lines 1 to 3) to insert at the cursor in the buffer 601 to complete the hello( ) function.

In FIG. 7, example 700 shows a buffer 701, and a prediction 702 generated by the model 112 for that buffer 701. In example 700, a cursor is located at line 3 of the buffer 701. Since line 3 is a blank line, the cursor indentation component 201 identifies an indentation level of one for the cursor, which is the indentation level of line 2 (i.e., the most recent non-blank line preceding the cursor). Prediction 702 includes lines 1 to 7, though the ellipses indicate that it could continue. A brace 703 indicates a block of lines that are selected by the block selection component 202. Here, line 1 is included in the block, because it is the first line in the prediction and thus the line is included by the initial line component 203. Lines 2, 4, and 5 are also included in the block, because these lines have a greater indentation level than the cursor and thus the lines are included by the indentation component 204. Line 3 is also included in the block, even though the line has the same indentation level as the cursor, because it contains an "else" keyword, which is a continuation token and thus the line is included by the continuation token component 205. Line 6 is initially included in the block, because it is blank. Line 7 is not included in the block, because it has the same indentation level as the cursor, and because it is not the first line in the prediction and contains no continuation token; thus, line 7, and any lines following it, are trimmed by the trimming component 207. While line 6 was initially included in the block, in embodiments it is later removed from the block by the post-processing component 206, as being a trailing blank line. The prediction component 110 has therefore selected an appropriate block of lines (i.e., lines 1 to 5) to insert at the cursor in the buffer 701 to complete the 'if' statement.

In FIG. 8, example 800 shows a buffer 801, and a prediction 802 generated by the model 112 for that buffer 801. In example 800, a cursor is located at line 2 of the buffer 801. Line 2 is a blank line, and the cursor indentation component 201 identifies an indentation level of one for the cursor, which is the maximum indentation level of lines 1 and 3 (i.e., the first non-blank lines before, and after, the cursor). Prediction 802 includes lines 1 to 7, though the ellipses indicate that it could continue. A brace 803 indicates a block of lines that are selected by the block selection component 202. Here, line 1 is included in the block, because it is the first line in the prediction and thus the line is included by the initial line component 203. Line 2 is also included in the block, because line 2 has a greater indentation level than the cursor and thus the line is included by the indentation component 204. Line 3 is also included in the block, even though the line has the same indentation level as the cursor, because it contains an "else" keyword, which is a continuation token and thus the line is included by the continuation token component 205. Line 4 is also included in the block, because line 4 has a greater indentation level than the cursor and thus the line is included by the indentation component 204. Line 5 is not included in the block, because it has the same indentation level as the cursor, and because it is not the first line in the prediction and contains no continuation token. Thus, line 5 and any lines following it are trimmed by the trimming component 207. The prediction component 110 has therefore selected an appropriate block of lines (i.e., lines 1 to 4) to insert at the cursor in the buffer 801 to partially fill in the hellofun( ) function, while taking into account the already-existing print statement at line 3.

In FIG. 9, example 900 shows a buffer 901, and a prediction 902 generated by the model 112 for that buffer 901. In example 900, a cursor is located at line 2 of the buffer 901. Line 2 is a non-blank line, and the cursor indentation component 201 identifies an indentation level of one for the cursor. Prediction 902 includes lines 1 to 3, though the ellipses indicate that it could continue. A brace 903 indicates that only line 1 is selected by the block selection component 202. Here, line 1 is included in the block, because it is the first line in the prediction and thus the line is included by the initial line component 203. Line 2 is not included in the block, even though line 2 contains a continuation token (a comment symbol, '//') because the cursor is not within the context of a multi-line comment; thus, line 2, and any lines following it, are trimmed by the trimming component 207. The prediction component 110 has therefore selected an appropriate block of lines (i.e., line 1 only) to insert at the cursor in the buffer 901 to complete the "print" statement.

Embodiments are now described in connection with FIG. 10, which illustrates a flow chart of an example method 1000 for using indentation to trim output of a language synthesis model. In embodiments, instructions for implementing method 1000 are encoded as computer-executable instructions (e.g., output trimming component 111) stored on a computer storage media (e.g., storage media 104) that are executable by a processor (e.g., processor 102) to cause a computer system (e.g., computer system 101) to perform method 1000.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Initially, as discussed, embodiments can identify a line containing no characters at all, or a line containing only whitespace characters such as spaces or tabs, as a blank line. Thus, in some embodiments of method 1000, a line containing only whitespace characters is determined to be a blank line.

Figure 10:
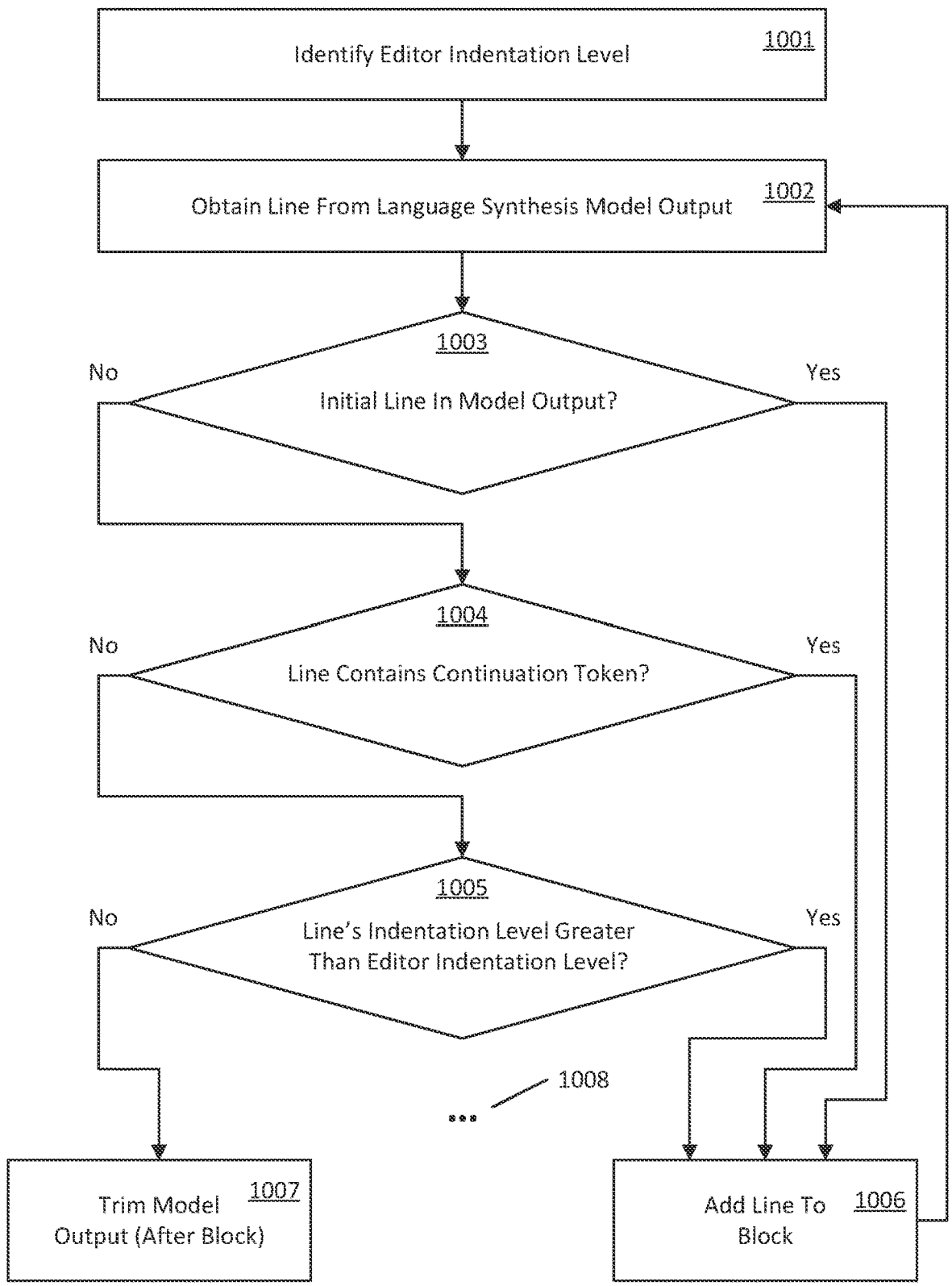
FIG. 10 illustrates a flow chart of an example method for using indentation to trim output of a language synthesis model.

Referring to FIG. 10, in embodiments, method 1000 comprises an act 1001 of identifying an editor indentation level. In some embodiments, act 1001 comprises determining a first indentation level associated with a cursor within an editor buffer. In an example, the cursor indentation component 201 determines an indentation level of a cursor within a buffer of editor 113.

FIG. 3 demonstrates that, when a cursor is located in a non-blank line, the cursor indentation component 201 uses the indentation level of that line. Thus, in some embodiments, determining the first indentation level comprises determining that the first indentation level is equal to an indentation level of a line within the editor buffer at which the cursor is located.

FIG. 4 demonstrates that, when a cursor is located in a blank line, the cursor indentation component 201 may use the indentation level of a most recent non-blank line. Thus, in some embodiments, determining the first indentation level comprises determining that the first indentation level is equal to an indentation level of a non-blank line before a line within the editor buffer at which the cursor is located.

FIG. 5 demonstrates that, when a cursor is located in a blank line, the cursor indentation component 201 may also consider the indentation level of the next non-blank line. Thus, in some embodiments, determining the first indentation level comprises determining that the first indentation level is equal to an indentation level of a non-blank line after a line within the editor buffer at which the cursor is located. As discussed, the cursor indentation component 201 may choose to use the maximum of the indentation level of the most recent non-blank line, and the indentation level of the next non-blank line. Thus, in some embodiments, determining the first indentation level comprises determining that the first indentation level is equal to a maximum of a third indentation level of a first non-blank line before a line within the editor buffer at which the cursor is located, and a fourth indentation level of a second non-blank line after the line within the editor buffer at which the cursor is located.

Method 1000 also comprises an act 1002 of obtaining a line from language synthesis model output. For example, the block selection component 202 analyzes a sequence of lines from a prediction output by the model 112, and may do so iteratively (e.g. each line in sequence). As discussed, for each line, the block selection component 202 uses one or more criteria to determine if the line should be included in a selected block of one or more lines. Thus, in embodiments, method 1000 comprises identifying a block of one or more lines from an output from a language synthesis model, each line in the block of one or more lines meeting at least one criterion from a set of criteria.

In method 1000, the set of criteria are represented as a series of decision blocks, including a decision block 1003 of determining if the line is an initial line in model output, a decision block 1004 of determining if the line contains continuation token, and a decision block 1005 of determining if the line's indentation level greater than editor indentation level. While decision blocks 1003-1005 are arranged in a particular serial order in method 1000, it will be appreciated that alternate embodiments could arrange them in different orders, or even perform some of them in parallel. Additionally, an ellipses 1008 indicates that alternate embodiments could use additional, or alternate, decisions/ criteria.

Referring to decision block 1003, in embodiments of method 1000, the set of criteria include a criterion (e.g., initial line component 203) that the line is an initial line in the output from the language synthesis model.

Referring to decision block 1004, in embodiments of method 1000, the set of criteria include a criterion (i.e., continuation token component 205) that the line contains a continuation token. For example, in embodiments, a continuation token is same-level control flow keyword, an end keyword, a brace control symbol, or a multi-line comment symbol, and may be defined by one or more regular expressions. In embodiments, this criterion applies to a line only if a context of the cursor within the editor buffer is associated with the continuation token (e.g., in the case of a multiline comment, as demonstrated in connection with FIG. 9). Additionally, in embodiments, a continuation token may only be considered if the token appears at the beginning of the non-whitespace part of the line, if the indentation of that line is equal to the cursor's line, and/or if the indentation satisfies another pre-set token-specific criterion (e.g., being zero).

Referring to decision block 1005, in embodiments of method 1000, the set of criteria include a criterion (i.e., indentation component 204) the line has a second indentation level that is greater than the first indentation level associated with the cursor. As discussed, the indentation component 204 treats a blank line in the output from the model 112's prediction that follows a non-blank line in the output as having indentation strictly greater than the cursor's indentation. Thus, in embodiments of method 1000, a blank line in the output from the language synthesis model is determined to have an indentation level greater than the first indentation level.

As shown in method 1000, when the outcome of at least one of decision block 1003, decision block 1004, and/or decision block 1005 is "yes" for a given line, method 1000 proceeds an act 1006 of adding that line to a block of selected lines. As shown by an arrow between act 1006 and act 1002, after reaching act 1006, method 1000 proceeds back to act 1002 to analyze the next line in the language synthesis model's output. Thus, by repeating act 1002 to act 1006, method 1000 selects a block of one or more lines.

When the outcome of each of decision block 1003, decision block 1004, and/or decision block 1005 is "no" for a line, on the other hand, method 1000 ends with an act 1007 of trimming the model output (after the block). In embodiments, act 1007 comprises identifying a particular line, immediately following the block of one or more lines, that does not meet any criterion from the set of criteria, and trimming the output from the language synthesis model from the particular line onward. In some embodiments, based on having identified the particular line, method 1000 comprises stopping generation of the output by the language synthesis model.

Although not shown in FIG. 10, in embodiments the block of lines selected through operation of method 1000 may be inserted at the cursor location, or at least provided as a suggested insertion at the cursor location (e.g., using the block communication component 208). Thus, in embodiments, method 1000 also comprises inserting the block of one or more lines at the cursor.

Embodiments of the disclosure may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EE- PROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor, for using indentation to trim output of a language synthesis model, the method comprising:
   determining a first indentation level associated with a location of a cursor within an editor buffer that is displayed at the computer system;
   identifying a block of one or more lines from an output from a language synthesis model, each line in the block of one or more lines meeting at least one criterion from a set of criteria, the set of criteria including:

a first criterion that the line is an initial line in the output from the language synthesis model, a second criterion that the line has a second indentation level that is greater than the first indentation level, and a third criterion that the line contains a continuation token;

identifying a particular line, immediately following the block of one or more lines, that does not meet any criterion from the set of criteria;

based on having identified the particular line,
trimming the output from the language synthesis model from the particular line onward; and
stopping generation of the output by the language synthesis model; and inserting the block of one or more lines at the location of the cursor within the editor buffer at the computer system.

2. The method of claim 1, wherein a blank line in the output from the language synthesis model is determined to have an indentation level greater than the first indentation level.

3. The method of claim 1, wherein a line containing only whitespace characters is determined to be a blank line.

4. The method of claim 1, wherein determining the first indentation level comprises determining that the first indentation level is equal to an indentation level of a line within the editor buffer at which the cursor is located.

5. The method of claim 1, wherein determining the first indentation level comprises determining that the first indentation level is equal to an indentation level of a non-blank line before a line within the editor buffer at which the cursor is located.

6. The method of claim 1, wherein determining the first indentation level comprises determining that the first indentation level is equal to an indentation level of a non-blank line after a line within the editor buffer at which the cursor is located.

7. The method of claim 1, wherein determining the first indentation level comprises determining that the first indentation level is equal to a maximum of a third indentation level of a first non-blank line before a line within the editor buffer at which the cursor is located, and a fourth indentation level of a second non-blank line after the line within the editor buffer at which the cursor is located.

8. The method of claim 1, wherein the third criterion applies only if a context of the cursor within the editor buffer is associated with the continuation token.

9. The method of claim 1, wherein the continuation token is defined by regular expression.

10. The method of claim 1, wherein the continuation token is same-level control flow keyword, an end keyword, a brace control symbol, or a multi-line comment symbol.

11. The method of claim 1, further comprising inserting the block of one or more lines at the cursor.

12. A computer system for using indentation to trim output of a language synthesis model, comprising:
a processor; and
a computer storage media that stores computer-executable instructions that are executable by the processor to cause the computer system to at least:
determine a first indentation level associated with a location of a cursor within an editor buffer at a remote computer system;
identify a block of one or more lines from an output from a language synthesis model, each line in the block of one or more lines meeting at least one criterion from a set of criteria, the set of criteria including:
a first criterion that the line is an initial line in the output from the language synthesis model,
a second criterion that the line has a second indentation level that is greater than the first indentation level, and
a third criterion that the line contains a continuation token;
identify a particular line, immediately following the block of one or more lines, that does not meet any criterion from the set of criteria;
based on having identified the particular line,
trim the output from the language synthesis model from the particular line onward; and
stop generation of the output by the language synthesis model; and
provide the block of one or more lines to the remote computer system for insertion at the location of the cursor within the editor buffer at the remote computer system.

13. The computer system of claim 12, wherein a blank line in the output from the language synthesis model is determined to have an indentation level greater than the first indentation level.

14. The computer system of claim 12, wherein a line containing only whitespace characters is determined to be a blank line.

15. The computer system of claim 12, wherein determining the first indentation level comprises at least one of:
determining that the first indentation level is equal to a third indentation level of a line within the editor buffer at which the cursor is located;
determining that the first indentation level is equal to a fourth indentation level of a first non-blank line before the line within the editor buffer at which the cursor is located;
determining that the first indentation level is equal to a fifth indentation level of a second non-blank line after the line within the editor buffer at which the cursor is located; or
determining that the first indentation level is equal to a maximum of the fourth indentation level and the fifth indentation level.

16. The computer system of claim 12, wherein the third criterion applies only if a context of the cursor within the editor buffer is associated with the continuation token.

17. The computer system of claim 12, the computer-executable instructions also including instructions that are executable by the processor to cause the computer system to insert the block of one or more lines at the cursor.

18. A computer program product comprising a computer storage media that stores computer-executable instructions that are executable by a processor to cause a computer system to use indentation to trim output of a language synthesis model, the computer-executable instructions including instructions that are executable by the processor to cause the computer system to at least:
determine a first indentation level associated with a location of a cursor within an editor buffer at the computer system;
identify a block of one or more lines from an output from a language synthesis model, each line in the block of one or more lines meeting at least one criterion from a set of criteria, the set of criteria including:

a first criterion that the line is an initial line in the output from the language synthesis model, a second criterion that the line has a second indentation level that is greater than the first indentation level, and a third criterion that the line contains a continuation token, wherein the second criterion applies only if a context of the cursor within the editor buffer is associated with the continuation token;

identify a particular line, immediately following the block of one or more lines, that does not meet any criterion from the set of criteria;

based on having identified the particular line,
trim the output from the language synthesis model from the particular line onward; and
stop generation of the output by the language synthesis model; and insert the block of one or more lines at the location of the cursor within the editor buffer at the computer system.

\* \* \* \* \*